Patented Nov. 17, 1936

2,061,451

UNITED STATES PATENT OFFICE 2,061,451

AGE RESISTER

Albert M. Clifford, Stow, Ohio, assignor to Wingfoot Corporation, Wilmington, Del., a corporation of Delaware No Drawing. Application July 27, 1935,
Serial No. 33,564

12 Claims. (Cl. 18—50)

This invention relates to a method of treating rubber to increase the age-resisting properties of articles made from such rubber and to rubber so treated. More particularly, the invention relates to the incorporation in rubber compounds of a reaction product of amines on wood creosote fractions.

Rubber, as is well known, is subject to deterioration in the course of time due to the effects of heat, light, air, flexing and other influences. Various individual chemical compounds have been incorporated in rubber mixtures to retard this ageing and deterioration of the rubber but it has been found that mixtures of chemical compounds, in place of individual substances, are particularly advantageous for this purpose, possessing, as they do, a lesser tendency to bloom on the surface of the rubber article, being more readily and effectively dispersed throughout the rubber, and causing a reduction in flex cracking. The present invention concerns a complex product of this nature prepared by treating a wood creosote fraction, as found on the market or as specially prepared, with any one or more of various amines, under suitable conditions, to yield a mixture which is easily incorporated in rubber and has a marked effect on the age-resisting properties of such rubber.

Hard wood creosotes are preferably employed, these containing phenolic bodies, such as phenol, cresol, guaiacol, creosol and other alkali-soluble compounds, the latter being phenolic in nature and of higher molecular weight and not all of known constitution. Various commercial wood creosotes may be selected for the present purpose and one of these, known as Grade #1, is identified by the following fractional composition.

| Fraction | Percent composition | Acid number |
|---|---|---|
| 1. Low b. p. oil plus water | 2.1 | 200 |
| 2. B. p. 120–180° C | 5.2 | 220 |
| 3. B. p. 180–195° C | 8.1 | 114 |
| 4. B. p. 195–250° C | 59.8 | ±27 |
| 5. Residue, black tar | 24.+ | |

The wood creosote is reacted with an amine to yield the antioxidant and the entire creosote oil may be so treated. However, it is preferred to select Fraction #4, above, coming over on distillation between 195°–250° C. This fraction is treated with 5% of its weight of sodium carbonate, washed with water, and dried over calcium chloride. The resulting product is free of acid and phenol but may contain traces of cresols.

The pale colored oil thus obtained is used in condensation reactions with aromatic amines.

The main constituents of this purified fraction which react with amines are

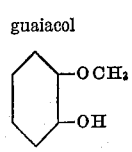 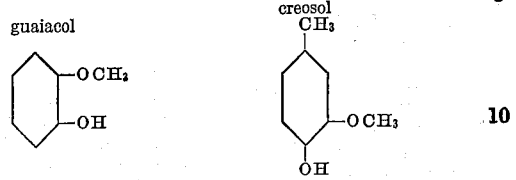

and other methyl ethers of phenols. The creosote fraction condenses readily with aromatic amines, such as aniline, naphthylamine, etc., with loss of water and sometimes of methane as set forth in the following examples.

Example 1

A mixture of 465 parts of aniline, 248 parts of creosote Fraction #4, and 3.6 parts of $AlCl_3$ were heated in an autoclave for 14 hours at a temperature of 390° C. At the end of this time, the resulting mass was distilled between 130–300° C. under a pressure of 50 mm. of mercury and 164 parts of distillate were obtained for use in ageing tests. The distillate is a brown oil of not unpleasant odor.

Example 2

A mixture of 150 parts of alpha naphthylamine, 260 parts of creosote Fraction #4 and 4.1 parts of $AlCl_3$ were heated under a reflux for 11.5 hours up to 240° C. The product was distilled collecting the fraction boiling above 140° C. under a pressure of 35 mm., and the 226 parts of distillate employed in the test tabulated hereinafter.

Example 3

Another wood creosote oil was used in this reaction, the same being that known commercially as Grade #2 and distilling over in large part up to a temperature of 220° C. under a pressure of 50 mm. of mercury. This distillate was used in a condensation reaction with aniline in the following manner: 250 parts of the creosote fraction distilling up to 220° C. under 50 mm., 300 parts of aniline and 2.75 parts of $AlCl_3$ were autoclaved at a temperature of 300°–340° C. for 7¼ hours. The resulting product was distilled and the whole fraction, having a boiling point between 75° and 240° C. under a pressure of 2 mm. and amounting to 162 parts, was subjected to ageing tests.

The above described antioxidant mixtures were subjected to tests in a rubber stock of the following composition:

| | Parts |
|---|---|
| Extracted rubber | 100 |
| Zinc oxide | 5 |
| Sulphur | 3 |
| Hexamethylene tetramine | 1 |
| Stearic acid | 1.5 |
| Antioxidant | 1 |

The cured test pieces were subjected to low temperature testing in an oxygen bomb at 50° C. under a pressure of 150 pounds per square inch for a period of 6 days. The results obtained were as follows:

| Cure | Original | | | | Tens. | Aged | | | Percent Wt. inc. |
|---|---|---|---|---|---|---|---|---|---|
| | Tens. | Elg. | 500% | 700% | | Elg. | 500% | 700% | |

Aniline + wood creosote fraction (from Grade #1)

| 35/285 | 114 | 895 | 12 | 38 | 116 | 830 | 15 | 54 | .01 |
| 50 | 130 | 820 | 17 | 63 | 126 | 774 | 20 | 83 | .08 |
| 70 | 151 | 775 | 23 | 91 | 154 | 745 | 28 | 118 | .13 |

Aniline + wood creosote fraction (from Grade #2)

| 35/285 | 98 | 870 | 12 | 37 | 107 | 840 | 14 | 46 | .01 |
| 50 | 127 | 820 | 18 | 64 | 120 | 780 | 20 | 75 | .09 |
| 70 | 132 | 760 | 24 | 91 | 197 | 740 | 28 | 113 | .08 |

Alpha naphthylamine + wood creosote fraction

| 35/285 | 90 | 890 | 11 | 30 | 98 | 850 | 15 | 43 | .10 |
| 50 | 105 | 820 | 25 | 50 | 118 | 795 | 20 | 65 | .14 |
| 70 | 135 | 785 | 21 | 80 | 123 | 740 | 25 | 97 | .15 |

The age-resisting compositions were also subjected to a high temperature ageing test and gave results which corroborated the low temperature tests above, as to the beneficial effects of the compositions in rubber. The rubber stock used for these tests had the following composition:

| | Parts |
|---|---|
| Smoked sheet | 100 |
| Zinc oxide | 92.5 |
| Carbon black | .6 |
| Fe₂O₃ | .7 |
| Sulfur | 3.5 |
| Diphenylguanidine | .7 |
| Antioxidant | 5.0 |

The ageing was done in an air bomb at 114° C. under a pressure of 80 pounds per square inch for 7 hours. The results obtained were as follows:

| Cure | Tens. | Elg. | 300% | 500% | Tens. | Elg. | 500% | 700% |
|---|---|---|---|---|---|---|---|---|

Aniline + creosote (from Grade #1)

| 35/285 | 224 | 725 | 26 | 79 | 99 | 650 | 22 | 51 |
| 50 | 230 | 685 | 32 | 95 | 106 | 625 | 28 | 66 |
| 70 | 218 | 635 | 38 | 110 | 117 | 610 | 33 | 77 |

Aniline + creosote (from Grade #2)

| 35/285 | 224 | 700 | 29 | 89 | 72 | 600 | 20 | 47 |
| 50 | 233 | 675 | 35 | 105 | 78 | 550 | 28 | 64 |
| 70 | 224 | 625 | 42 | 122 | 90 | 535 | 34 | 80 |

Alpha naphthylamine + wood creosote fraction

| 35/285 | 153 | 655 | 26 | 75 | 50 | 585 | 15 | 36 |
| 50 | 172 | 640 | 30 | 90 | 71 | 605 | 19 | 47 |
| 70 | 176 | 625 | 33 | 97 | 87 | 610 | 24 | 57 |

It will be observed from the low temperature ageing data that the increase in weight of the samples was very small, thus indicating a slow rate of absorption of oxygen. The tensile strength also remained approximately equal, on the average, to that of the sample before ageing, thus further indicating the excellent age-resisting qualities of the compositions described. The high temperature tests are more drastic but their significance lies in the fact that the rubber samples were not reduced to a resinous condition, devoid of strength, but on the contrary, still retained considerable tensile strength after this treatment.

While, as stated, the entire mass of commercial wood creosote fractions may be treated with amines to yield valuable age resisters, it is preferred, as indicated, to select certain fractions thereof. For example, it is preferred to distill the commercial wood creosote oil, for example that known as Grade #1, to obtain a fraction boiling approximately between 195°–250° C. under atmospheric pressure and to treat this, after suitable purification to remove small quantities of lower aliphatic acids, with an amine, since such fraction contains a higher percentage of ingredients which react with the amines to yield bodies having antioxidant properties. A useful product can also be obtained by selecting that portion of this creosote oil which boils between 120° and 250° C., thus excluding low boiling point oils and water, as well as the tarry residue, and reacting with an amine. The various creosote products all yield complex mixtures having antioxidant properties in useful degree, but elimination of the lower boiling constituents results in increasing intensity of antitoxidant powder in the final amine reaction product. Likewise, in the case of the commercial wood creosote known as Grade #2, the fraction distilling up to 220° C. under 50 mm. pressure will be more concentrated in reactive ingredients than the entire oil, although the entire oil may also be used to avoid the expense of purification.

Various primary aromatic amino compounds may be reacted with various wood creosote oils or fractions, the amines mentioned in the foregoing examples being merely illustrative. Thus, the following amines are also effective in yielding complex condensation products valuable for antioxidant purposes: ortho, meta, and para toluidines, the various mono methyl naphthylamines and poly methyl naphthylamines, para amino phenol and its isomers, the amino biaryls such as xenyl amine and its homologues as well as amino dinaphthyl and its homologues, amino acenaphthene, amino fluorene, cumidine, the various xylidines, furfurylamine, tetrahydro furfurylamine, tetrahydro naphthylamine, diamino diphenyl methane, diamino phenyl naphthyl ether, any one of the various naphthalene diamines, para phenylene diamine and its isomers, tolylene diamine and its isomers, diamino diphenyl amine, phenetidine, anisidine and others.

These condensation products of primary aromatic amines and wood creosotes may be further reacted to yield nitroso derivatives, sulphur reaction products, ketone, such as acetone, reaction products, and derivatives of various aldehydes, all of these likewise being suitable as deterioration inhibitors in rubber.

It will be understood that the term "treating" as employed in the accompanying claims includes any feasible method of incorporating the age resisters into the rubber by milling or other mechanical working, or their addition to rubber latex before coagulation, or the application of the age resisters to the surface of crude or vulcanized rubber. Similarly, it will be understood that the term "rubber" is employed in the claims to include rubber, reclaimed rubber, balata, gutta percha, rubber isomers, and like products, whether or not admixed with compounding ingredients.

While there have been disclosed herein improved embodiments of the invention, it will be understood that the same are by way of illustration and not of limitation, the procedures described and the materials utilized being capable of variation without departing from the scope of the invention as defined in the appended claims which are intended to cover all features of patentable novelty residing in the invention.

What I claim is:

1. The method of improving the age-resisting properties of rubber which comprises treating the same with a complex reaction product of wood creosote and a primary aromatic amine.

2. The method of improving the age-resisting properties of rubber which comprises treating the same with a complex reaction product of wood creosote and aniline.

3. The method of treating rubber which comprises incorporating in a rubber composition of vulcanization characteristics an age resister consisting of the complex reaction product of a wood creosote fraction, the major portion of which boils between about 120° and 250° C. at atmospheric pressure, and a primary aromatic amine.

4. The method of improving the age-resisting properties of rubber which comprises treating the same with a complex reaction product of a wood creosote fraction boiling between the limits of about 180° and 195° C. at atmospheric pressure and a primary aromatic amine.

5. The method of treating rubber which comprises incorporating in a rubber composition of vulcanization characteristics an age resister consisting of the complex reaction product of wood creosote and a naphthylamine.

6. The method of treating rubber which comprises incorporating in a rubber composition of vulcanization characteristics an age resister consisting of the complex reaction product of wood creosote and alpha naphthylamine.

7. The method of treating rubber which comprises incorporating in a rubber composition of vulcanization characteristics an age resister consisting of the complex reaction product of a wood creosote distilling in major part up to 220° C. at 50 mm. pressure and a primary aromatic amine.

8. The method of treating rubber which comprises incorporating in a rubber composition of vulcanization characteristics that portion distilling between about 130° and 300° of the reaction product of a wood creosote fraction boiling between the limits of about 180° and 195° C. at atmospheric pressure and aniline.

9. An age-resisting rubber composition comprising rubber and the antioxidant obtained by reacting wood creosote and a primary aromatic amine.

10. An age-resisting rubber composition comprising rubber and the antioxidant obtained by reacting a wood creosote fraction boiling between the limits of about 180° and 195° C. at atmospheric pressure and aniline.

11. An age-resisting rubber composition comprising rubber and the antioxidant obtained by reacting a wood creosote fraction the major portion of which boils between about 120° and 250° C. at atmospheric pressure and a primary aromatic amine.

12. An age-resisting rubber composition comprising rubber and the antioxidant obtained by reacting a wood creosote distilling in major part up to 220° C. at 50 mm. pressure and a primary aromatic amine.

ALBERT M. CLIFFORD.